United States Patent [19]
Windsor

[11] 4,413,714
[45] Nov. 8, 1983

[54] CLUTCH CONTROL SYSTEM

[75] Inventor: Harry M. Windsor, Harbury, England

[73] Assignee: Automotive Products Limited, Leamington Spa, England

[21] Appl. No.: 279,084

[22] Filed: Jun. 30, 1981

[30] Foreign Application Priority Data

Jul. 8, 1980 [GB] United Kingdom ............... 8022347

[51] Int. Cl.³ .................................... B60K 41/02
[52] U.S. Cl. ...................... 192/0.033; 192/3.58; 192/103 R; 361/242
[58] Field of Search ............. 192/0.033, 0.032, 0.034, 192/0.076, 3.58, 103 R, 0.052; 74/866; 361/239, 242

[56] References Cited

U.S. PATENT DOCUMENTS

| | | | |
|---|---|---|---|
| 3,622,208 | 11/1971 | Krugler | 361/242 X |
| 3,709,340 | 1/1973 | Murakami et al. | 192/3.58 |
| 3,714,509 | 1/1973 | Coleman et al. | 361/242 |
| 3,892,952 | 7/1975 | Shibata et al. | 361/242 X |
| 4,194,608 | 3/1980 | Usui et al. | 192/0.052 X |
| 4,200,175 | 4/1980 | Dick | 192/0.033 |
| 4,352,403 | 10/1982 | Burney | 361/242 X |

FOREIGN PATENT DOCUMENTS 1120132 7/1968 United Kingdom .
1427039 3/1976 United Kingdom .

Primary Examiner—George H. Krizmanich
Attorney, Agent, or Firm—Kemon & Estabrook

[57] ABSTRACT

An electronic control system for a motor vehicle friction clutch and which has an engine speed sensor, a reference signal generator, and a clutch actuator responsive to an error signal E derived from engine speed and reference signals $V_1$ and $V_R$ respectively. The error signal E is fed into an integrator having two operation modes, dependent upon whether a capacitor in the integrator circuit bypassed by the error signal E or not. With the capacitor initially bypassed by the error signal E the integrator has unity gain, and with the capacitor subsequently placed in the error signal path the integrator has high gain. By having two response modes the time delay between the error signal E reaching its trigger point and the clutch actuator responding is greatly reduced.

5 Claims, 7 Drawing Figures

CLUTCH CONTROL SYSTEM

This invention relates to electronic clutch control systems for the automatic control of friction clutches between the engine and transmission of motor vehicles.

In earlier Application Ser. No. 235,581 there is described a clutch control apparatus in which the engagement of the friction clutch is controlled by electronic means. In this earlier application there is described a control having an engine speed sensor and signal means, and a reference signal generator. An error signal for controlling the clutch take up is derived from the reference and engine speed signals. The error signal controls the operation of a clutch control system for the engagement of a clutch driven plate with its driving member.

A problem that we have encountered is that during clutch take up there is a time delay between the error signal reaching a predetermined trigger point and the clutch mechanism coming into operation.

The present invention seeks to provide an electronic control for the clutch operating mechanism in which the time delay is reduced.

Accordingly there is provided an electronic control system for a rotary transmission clutch which has an engine speed sensor and signal means, a reference signal generator, clutch actuator responsive to an error signal derived from comparison of the engine speed and reference signals, and an integrator located in the error signal path before the actuator wherein the integrator has a capacitor for switching in and out of the error signal circuit dependant upon the value of the error signal so that the integrator has two response modes for control of the actuator depending upon whether the capacitor is in or out of the circuit.

The invention will be described by way of example and with reference to the accompanying drawings in which.

Figure 3:
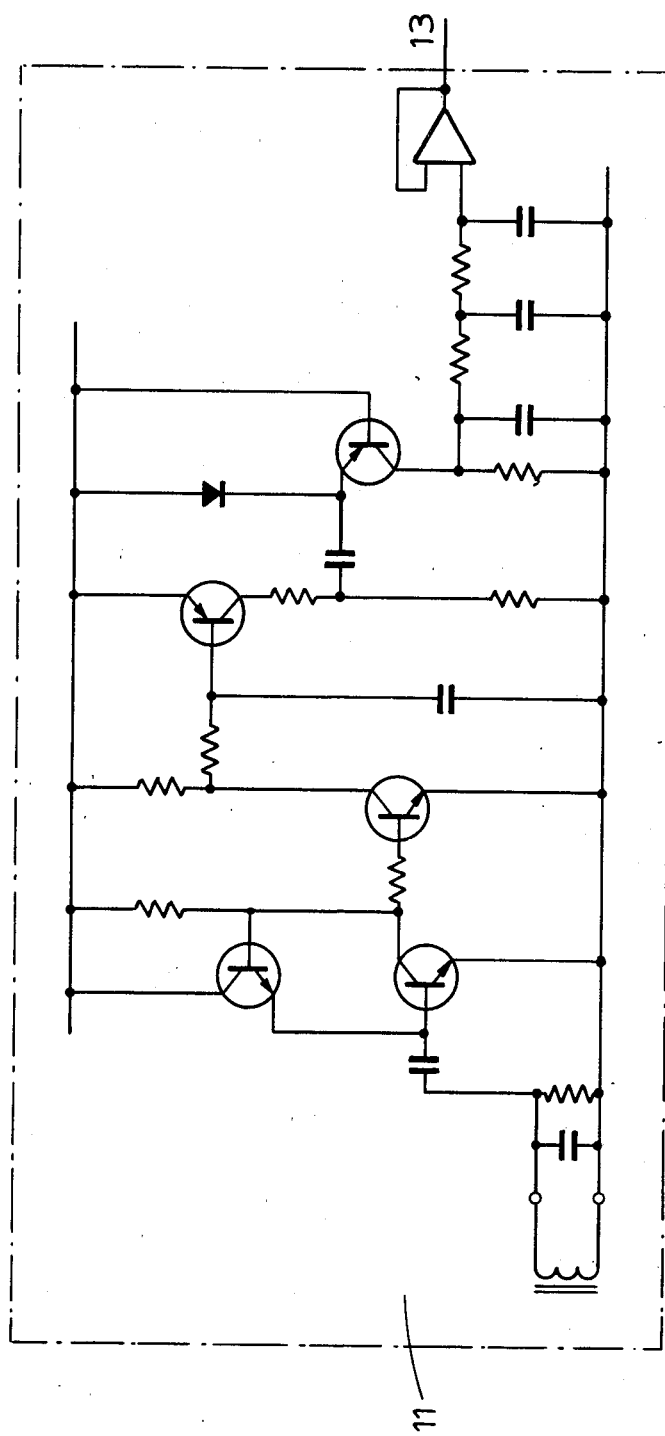
FIG. 3 is a detailed circuit of an engine speed sensor as used in FIG. 1.
Figure 4:
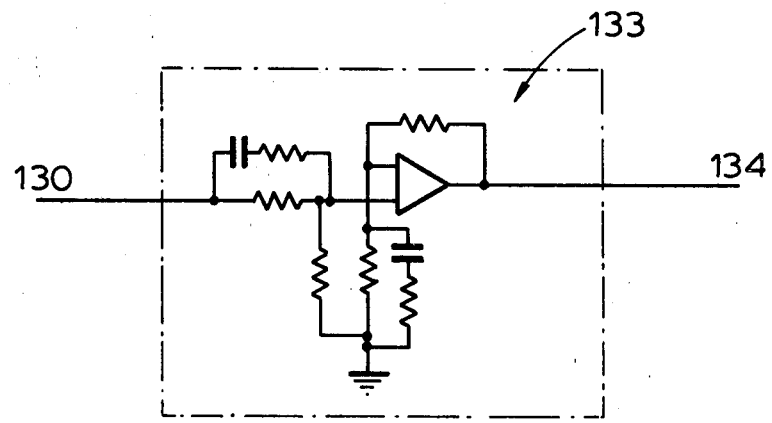
FIG. 4 is a detailed circuit of the phase gain shaping network utilised in FIG. 1.
Figure 5:
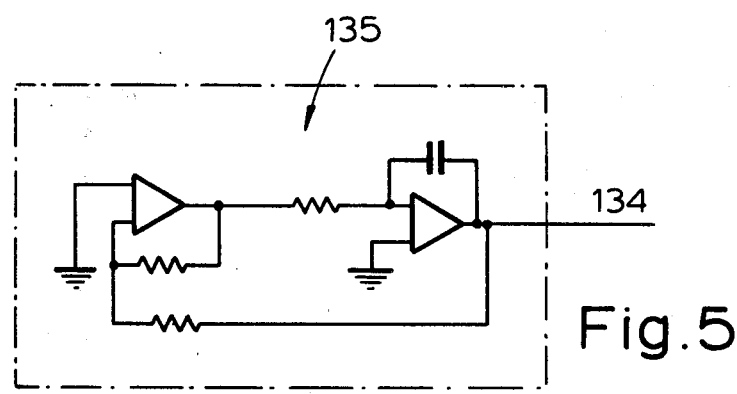
FIG. 5 is a detailed circuit of the oscillator of FIG. 1.
Figure 6:
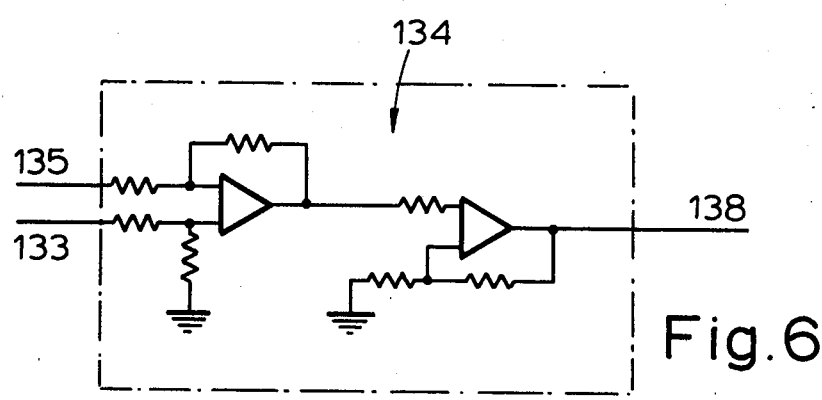
FIG. 6 is a detailed circuit of the mark space ratio modulator of FIG. 1.
Figure 7:
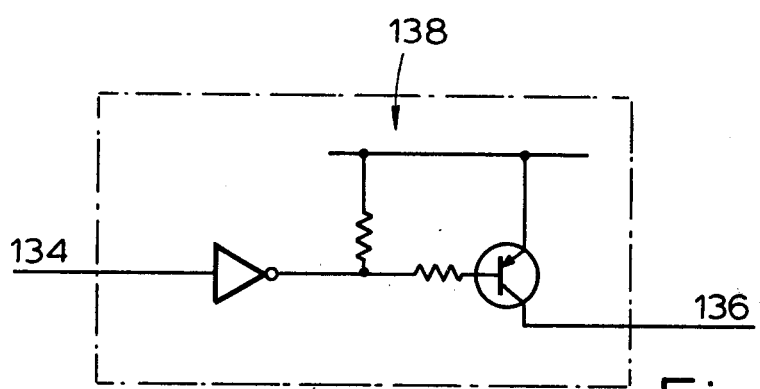
FIG. 7 is an output as used in FIG. 1.

The motor vehicle engine speed is sensed by a sensor 11 that produces a voltage $V_1$ proportional to the engine speed. The electrical circuit of the sensor is illustrated in FIG. 3 and is basically a magnetic probe sensing the teeth on the engine flywheel and a transistor pump. The sensor 11 is connected to a comparator 13 which measures the difference between the voltage $V_1$ and a voltage $V_R$ received from a reference voltage generator 14. This can for example be a potentiometer across the vehicle battery and can be set so that the reference voltage is the same as a signal obtained via the sensor 11 at a particular engine speed eg. 1000 rpm.

An error signal E from the comparator 13 is fed into an inverting integrator 15 which is in turn connected to a clutch position control which controls the operation of an actuator 27. The actuator 27 operates the vehicle clutch 23 and is powered by hydraulic pressure but could alternatively be pneumatic or electrical.

The clutch position control comprises a comparator 130 that receives a command signal $V_C$ from the integrator 15 and a feed back signal $V_P$ from a travel transducer 32 responsive to the clutch position. The feed back signal $V_P$ is representative of the position of the clutch 23. The signal derived from the comparator 130 is fed into a phase gain shaping network 133, a mark space ratio modulator and oscillator 134 and 135 respectively, and is then utilised via output 138 to control a solenoid operated hydraulic valve 136. The hydraulic valve 136 controls hydraulic flow through the hydraulic actuator 27. The mark space ratio of the signal fed into the solenoid valve 136 determines the hydraulic flow into the actuator and hence the rate of engagement of the clutch driven plate with its driving member. The shaping network 133, oscillator 135, mark space ratio network 134, and output are shown in detail in FIGS. 4 to 7 respectively.

The actuator 27 operates so as to equalise the feed back signal $V_P$ to the comparator 130, with the command signal $V_C$ from the integrator 15 consequently the actuator 27 takes up a position dictated by the command signal $V_C$ and which is proportional to the value of the command signal $V_C$, which in turn is responsive to the error signal E.

The clutch position control operates the actuator 27 during clutch take up to vary the state of engagement of the clutch driven plate with a driving member on the vehicle engine (not shown) and thereby alter the engine speed to cause the engine speed signal $V_1$ to approach equivalence with the reference signal $V_R$ and make the error signal E approach zero.

When the engine speed signal $V_1$ is lower than the reference signal $V_R$ the error signal E is positive and the clutch disengaged. When the signal $V_1$ exceeds $V_R$ the error signal becomes negative and the clutch loads the vehicle engine to cause the engine speed to decrease and make $V_1 = V_R$ at which point the error signal tends to approach zero. Hence for a given throttle opening during clutch take up the clutch engagement will arrive at the condition where $V_1 = V_R$. Once the clutch is fully engaged the engine speed can rise above the reference and the clutch control will hold the clutch fully engaged.

The error signal is fed to an integrator 15 which has a capacitor 17 that can be by-passed through a resistor 20 when a switch 18 is closed. The switch 18 is operated by a relay 19 which is responsive to the approach of the error signal E to zero and becoming negative. With the error signal positive the switch 18 is closed and there is approximately unity gain in the integrator 15 so that the error signal E is equal to the command signal $V_C$. When the error signal is negative the switch 18 is open and the capacitor 17 is placed in the error signal path the gain of the integrator 15 produces an amplified command signal $V_C$. During the period for which the error signal is positive and the integrator has unity gain the position of the clutch is dictated by the value of the error signal. At the point where $E = 0$ the clutch is in position where it is just beginning to engage with the engine, and the integrator 15 has a high gain and thereafter the velocity of the clutch is proportional to the error signal.

When the vehicle is started and the engine speed idling, the engine speed signal $V_1$ is less than the reference signal $V_R$ giving rise to a positive error signal E. The position of the clutch plate is inversely proportional to the size of the error signal E so that as the engine speed increases and $V_1$ increases, the error signal tends to zero. Since the contacts of the switch 18 are closed and $V_C$ is equal to E, then the clutch driven plate moves slowly into engagement with the engine driving member as E→0.

At the point where $V_1$ equals $V_R$ the error signal goes to zero and then negative as $V_1$ exceeds $V_R$, the relay 19 causes the switch 18 to open placing the capacitor 17 in operation across the integrator 15, increasing the gain. Because the integrator 15 is an inverting integrator then with the capacitor 17 by passed there is no build up of charge across the capacitor. Therefore, when the error signal E changes its polarity as $V_1$ approaches and then exceeds $V_R$, there is no time delay as the charge on the capacitor reverses its polarity ie. if there had been a charge on the capacitor some delay would be experienced as the capactior discharged before reversing its polarity.

Further, there is some delay in the period between the engine speed signal overshooting the value of $V_R$ and the clutch engagement pulling the engine speed back down to $V_1 = V_R$. By increasing the gain across the integrator 15 the period of delay between the error signal deviating from zero value and the clutch actuator 27 responding to move the clutch to a position where $V_1 = V_R$ is greatly reduced.

Figure 1:
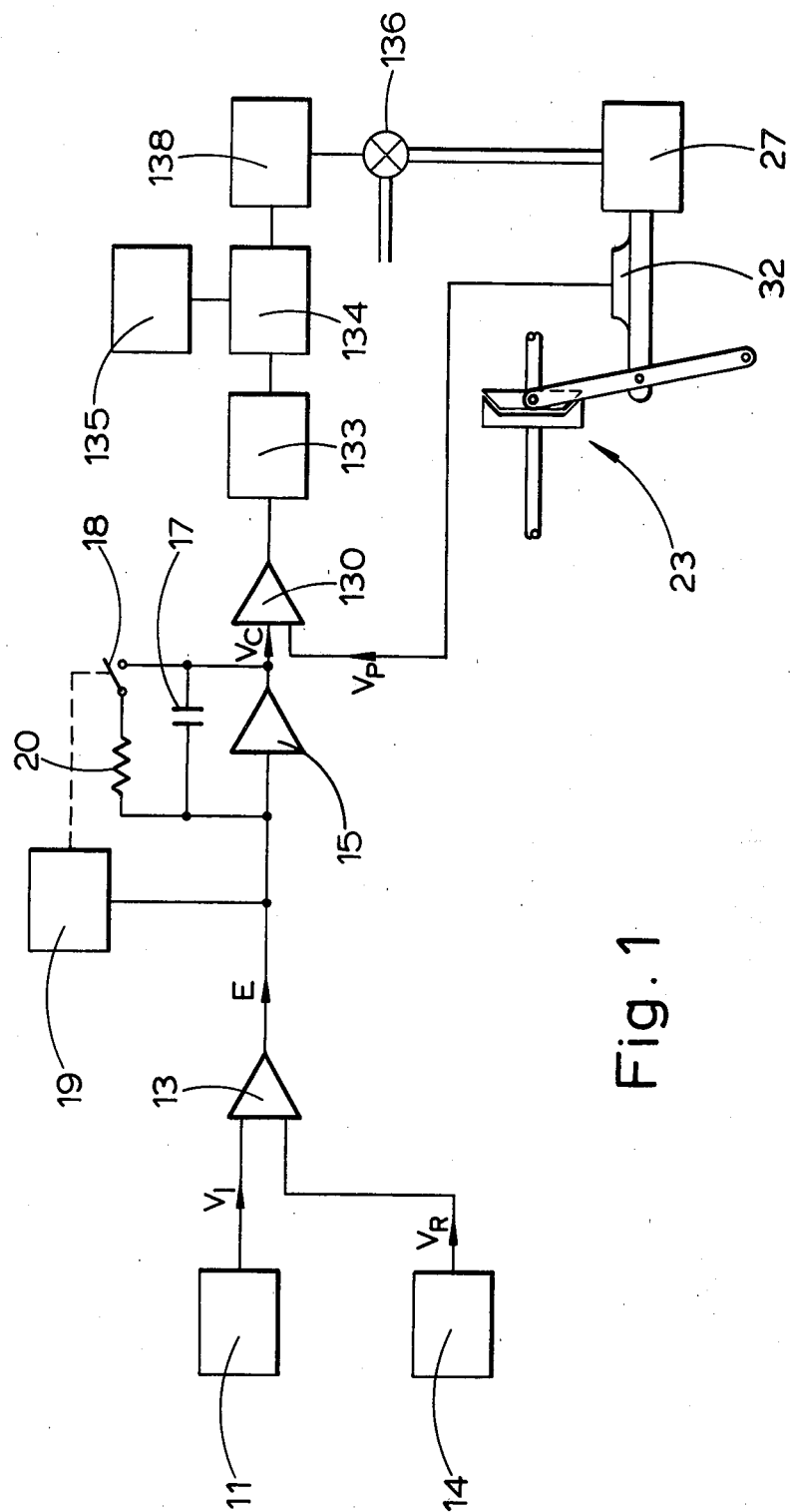
FIG. 1 is a schematic drawing of a clutch control system according to this invention.
Figure 2:
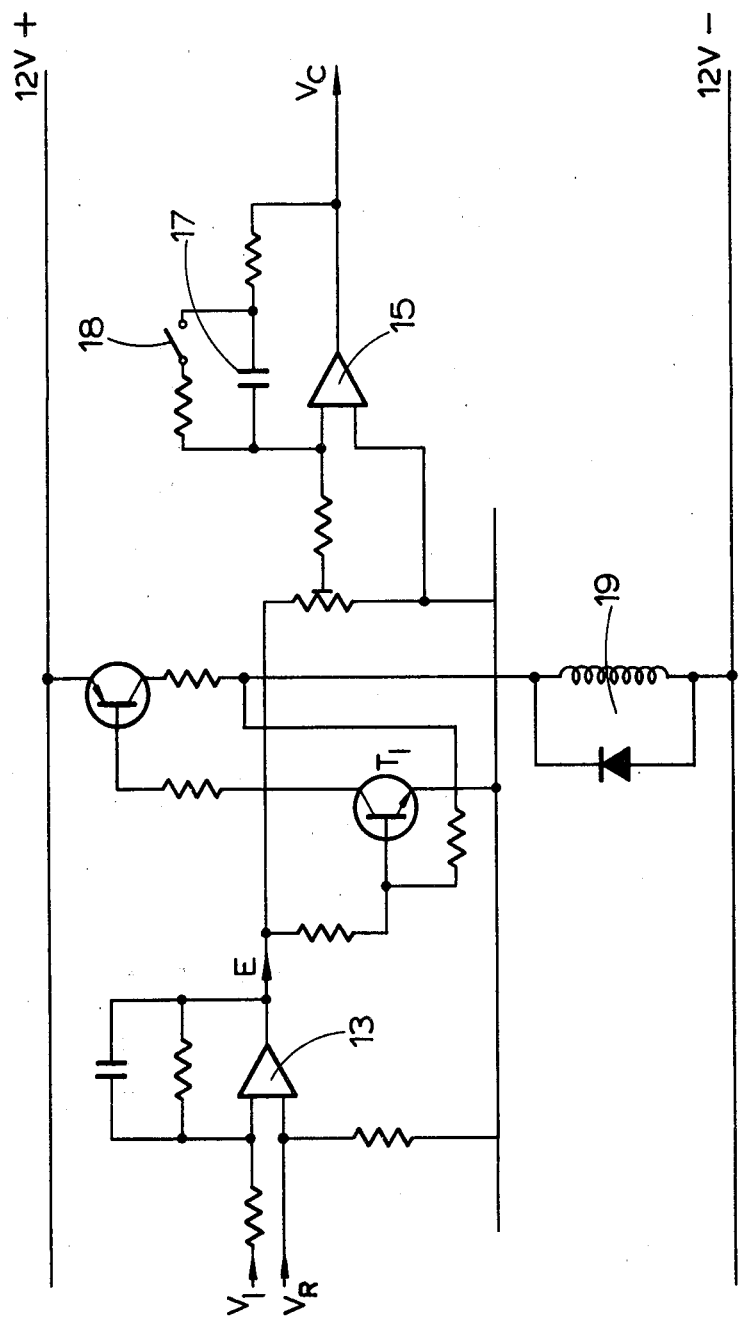
FIG. 2 is a detailed drawing of the circuit for the integrator and its controlling relay.

The integrator 15 and its switching circuit are shown in more detail in FIG. 2. When E is positive the transistor $T_1$ is on and causes the relay 19 to close its contacts 18. When E goes zero or negative the transistor $T_1$ switches off and the contacts 18 are open so that the capacitor 17 is switched into the control loop circuit and the integrator 15 is given a high gain.

The error signal E going to zero and negative activates the clutch position control to operate the actuator 27 to begin to engage the clutch plate with its driving member to increase the torque load on the engine and reduce the engine speed to make $V_1 = V_R$. The driver recognises the fall in engine speed and increases the throttle opening hence increasing $V_1$ which causes the clutch to further engage. This process of increasing the throttle opening and holding the engine speed steady by further engagement of the clutch will continue until the clutch is fully engaged.

I claim:

1. A vehicle transmission clutch electronic control system comprising:

an engine speed sensor;
means for producing an electrical engine speed signal representative of engine speed and derived from the sensor;
generator means for producing an electrical reference signal;
comparator means arranged to receive and compare said engine speed and reference signals and produces a consequent error signal;
an integrator which receives the error signal and has a capacitor with a switch means for causing the error signal to bypass said capacitor, or not, depending upon the state of the switch means, the state of said switch means being dependent upon the value of said error signal so that the integrator has two response modes to the error signal for consequent production of a command signal;
a clutch actuator that operates the clutch, and a control means responsive to the command signal and controlling the actuator.

2. An electronic control system as claimed in claim 1, wherein the error signal changes its polarity and value dependent upon the relative values of the engine speed and reference signals, and the approach of the error signal to zero value or to a different polarity switches the capacitor in and out of the circuit.

3. A clutch control system as claimed in claim 2, wherein when the error signal is positive the switch means causes the error signal to bypass the capacitor and when the error signal is zero or negative the capacitor is swtiched into the error signal path.

4. A clutch control system as claimed in claim 1, wherein the switch means whereby the capacitor is switched in and out of the error signal path is a transistor controlling relay operated contacts, said transistor responding to the approach of the error signal to a zero value as the engine speed signal changes from being less than, to greater than the reference signal, and actuating the relay to open the contacts and place the capacitor into the error signal path.

5. A system as claimed in anyone of claims 1 to 4, wherein the integrator, in one operational mode with the capacitor bypassed by the error signal path has unity gain, and with the capacitor placed in the error signal path has high gain.

* * * * *